No. 737,789. Patented September 1, 1903.

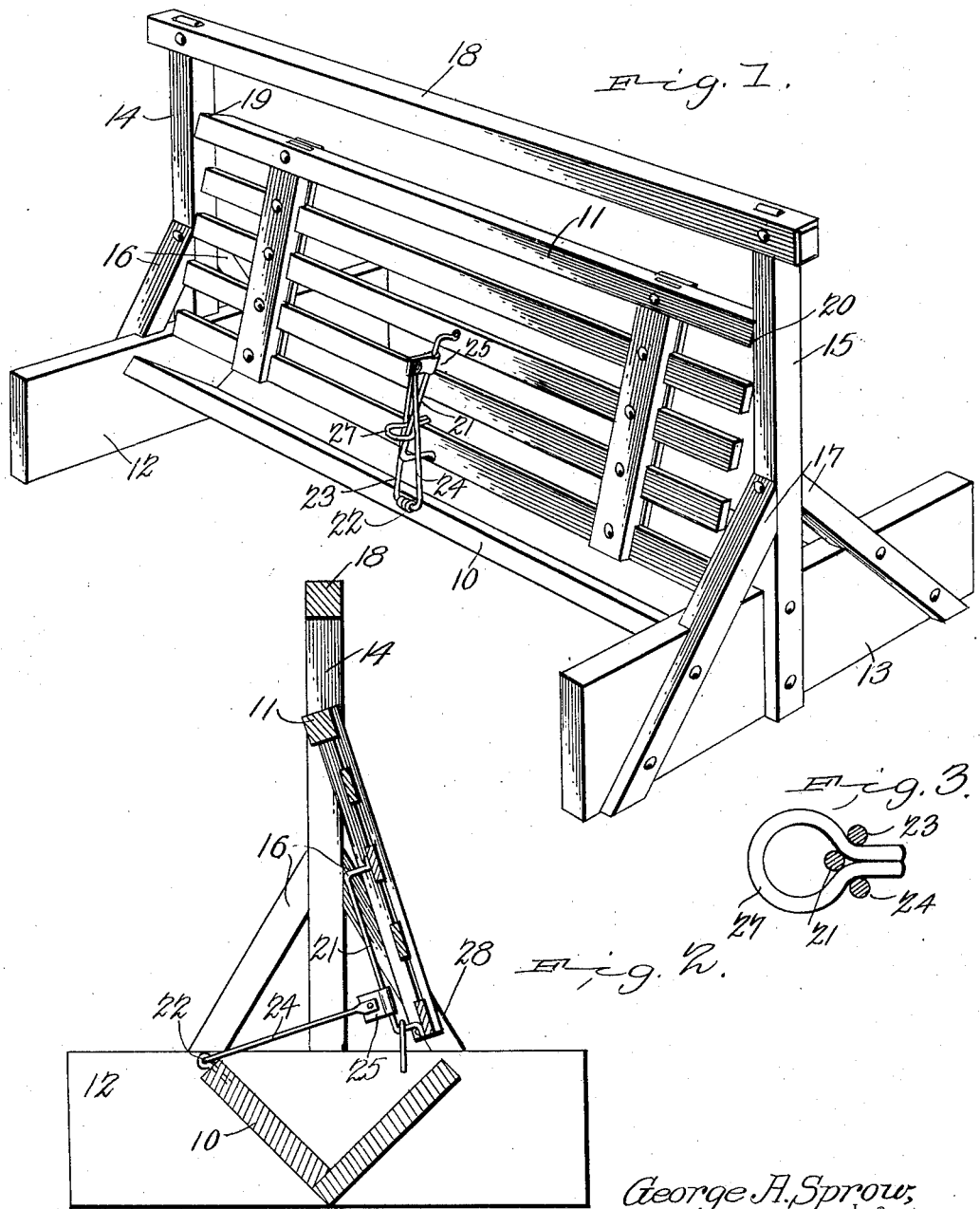

UNITED STATES PATENT OFFICE.

GEORGE ADAM SPROW, OF PAULDING, OHIO.

FEED-TROUGH.

SPECIFICATION forming part of Letters Patent No. 737,789, dated September 1, 1903.

Application filed December 19, 1902. Serial No. 135,934. (No model.)

*To all whom it may concern:*

Be it known that I, GEORGE ADAM SPROW, a citizen of the United States, residing at Paulding, in the county of Paulding and State of Ohio, have invented a new and useful Feed-Trough, of which the following is a specification.

This invention relates to devices employed for feeding stock, and has for its object the production of a simply-constructed and convenient device whereby access to the feed-trough may be shut off while placing the feed therein or at other times when so desired; and the invention consists in certain novel features of construction, as hereinafter shown and described, and specified in the claims following.

In the drawings illustrative of the invention, in which like designating characters are employed to denote corresponding parts, Figure 1 is a perspective view with the shut-off member arranged to permit access to the feed side of the trough, and Fig. 2 is a transverse section with the shut-off member arranged to prevent access to the feed side of the trough. Fig. 3 is an enlarged sectional detail illustrating the construction and operation of the locking-clip.

The improved feeding device may be constructed of any desired size or of any suitable material, but will preferably be of wood, and located in any desired position relative to other structures. It will preferably be disposed to form a part of the inclosure for the animals to be fed, such as a pasture or barn-yard fence or a part of the walls of the feed-pens or stalls, and I do not, therefore, wish to be limited to the size or capacity of the structure or its location relative to other structures, as it may be employed independently of other structures or in connection therewith, as circumstances may require.

The device consists of a feed-trough 10 of the ordinary construction having suspended above it a frame 11, the latter suitably supported and adapted to swing from side to side and form a shut-off to the feed-trough alternately, so that when in one position it will prevent access to the feed side of the trough and when in the other position will prevent the animals passing over the feed-trough and escaping from the inclosure. The trough member 10 will be provided with laterally-extended ends 12 13, which not only form closures to the ends of the trough, but also serve as supports therefor, as indicated.

Rising from the end members 12 13 are uprights 14 15, suitably supported by braces 16 17, respectively, as shown. The upper ends of the standards 14 15 are connected by a longitudinal head member 18, the standards and head member forming a supporting-frame, as shown, whereby the swinging shut-off 11 is supported by its upper side, the shut-off plate being pivotally connected to the standards by its ends, as indicated at 19 20. The frame 11 is thus free to swing between the standards 14 15, with its lower edge coming relatively near the upper edges of the trough 10 when in its two positions, as indicated in Figs. 1 and 2, the shut-off frame being shown in one position adjacent to one edge of the feed-trough in Fig. 1 and adjacent to the opposite edge of the feed-trough when in its other position, as shown in Fig. 2.

The device will be so located that the feed side will be placed to the inside of the inclosure, and the fastening means for supporting the shut-off plate will be attached to the opposite side, so that the operator may actuate the fastening means from the outside of the inclosure.

The shut-off member 11 may be constructed in any desired manner, but will preferably be formed of spaced slats connected by transverse members and suitably bolted together and secured, as shown, and I do not, therefore, wish to be limited to any specific manner of constructing this part of the device. If the device is arranged to form a portion of the fence of the inclosure, the member 11 will preferably be constructed to conform to and correspond to the fence, of which it will appear to form a part; but if the member 11 is constructed to form a portion of the walls of a pen or stall it will preferably be made to correspond to the adjacent portions thereof.

Attached to the member 11 opposite the feed side of the trough is a guide-bar vertically disposed relative to the shut-off member and connected by its ends thereto and spaced therefrom, as shown at 21. Pivotally connected at 22 to the side of the trough opposite the feed side is a lever-arm, preferably formed with spaced side members 23 24, and pivotally connected by their free ends to a clip 25, the latter slidably connected to the bar 21, as shown. The relative lengths of the lever-arm 23 24 and the bar 21 will be such that when the clip 25 is moved to its lowermost position, as shown in Fig. 2, the shut-off member 11 will be maintained in position to prevent access to the feed side of the trough, as will be evident, and then when the clip 25 is moved into its upward position, carrying the lever-arm with it, it will cause the shut-off member 11 to be moved into its reversed position, as shown in Fig. 1, the lower portion of the bar 21 passing between the members 23 24 and projecting slightly beyond them, as indicated in Fig. 1, this latter position of the bar 21 providing for the connection thereto of a locking-clip to enable the shut-off member to be locked into the position shown in Fig. 1. When the lever-arm 23 24 and clip 25 are in the position shown in Fig. 2, the lever-arm and clip will be supported substantially at right angles to the bar 21 and shut-off 11 and forming a positive locking means between the shut-off and trough and support the former immovably in position to prevent access to the trough from the feed side.

The bar 21 will be provided with means whereby it may be locked into engagement with the lever-arm 23 24 when the shut-off plate is in the position shown in Fig. 1, and an approved form of this locking means is shown, consisting in a substantially circular loop 27, extended at one side into spaced arms and adapted when placed in the position shown in Fig. 3 to form a detachable clip to lock the two members 21 and 23 24 together, and thus rigidly maintain the shut-off member 11 in position to prevent the animals from passing over the trough and escaping. When the parts are to be released, it is only necessary to turn the clip member 27 one-fourth around, when it will pass through the space between the bars 23 24 and release the bar from the lever-arm. By this simple arrangement the shut-off frame 11 may be adjusted to shut off access to the feed side of the trough or to permit access thereto and at the same time prevent the animals escaping from over the feed-trough and firmly locking the shut-off member in either of its two positions, the locking means being readily releasable when desired, as will be obvious.

The members 21, 23 24, and 25 will preferably be of metal rods, which may be manufactured by any blacksmith, and the member 27 will likewise be a section of metal rod bent to the proper shape and held in position by the friction produced by the gravity of the member 11.

The metal parts of the device may be formed of other material than metal rods, if preferred, and may be manufactured of any desired size and modified in minor particulars to adapt them to different sizes of troughs and shut-off frames to which they will be applied.

The whole device is simple in construction, easily made and applied, and may be adapted to supply feed to different kinds of animals, but is more particularly adapted to the feeding of swine, but may be employed, with slight modifications, to the feeding of sheep, calves, and other animals, and I do not, therefore, wish to be limited in the use of the device, but reserve the right to its employment in any locality and for any purpose to which it is adapted.

By employing this improved device the feed may be placed in the trough without interference from the animals and the animals prevented from feeding except at certain predetermined intervals. In feeding weakly animals it is frequently desirable to feed only small quantities of food at certain predetermined intervals, and in such cases this improved device will be found admirably adapted to this purpose, as the feeding may be easily regulated and controlled. By this device also access to the feed-trough may be shut off at any time desired during the feeding to regulate the supply.

Stops 28 will be arranged upon the stationary framework in position to be engaged by the shut-off member 11 when in the position shown in Fig. 2 to limit the movement in that direction, so that in event of the failure of the locking mechanism to operate or in event of its breakage the shut-off member will not be operative beyond the framework to permit the animals to escape.

Having thus described the invention, what is claimed is—

1. In a stock-feeder, a feed-trough, a swinging division-frame longitudinally disposed relative to said trough, a guide-bar carried by said division-frame and spaced therefrom, a lever-arm pivotally connected to said trough by one end and movably connected to said spaced bar by the other end, whereby said lever-arm when in one position will cause said frame to shut off access of the animals to said trough from one side, and when in the opposite position will cause said frame to prevent the escape of the animals over the trough from the opposite side, substantially as described.

2. In a stock-feeder, a feed-trough, a swinging frame longitudinally disposed relative to said trough, a guide-bar carried by said division-frame and spaced therefrom, a lever-arm pivotally connected to said trough by one end and movably connected to said spaced bar by the other end, whereby said lever-arm when in one position will cause said frame to shut off access of the animals to said trough from one side, and when in its opposite relation will be positioned adjacent to said guide-bar and cause said frame to prevent the escape of the animals over said trough from the opposite side, and means for locking said guide-bar and lever-arm into engagement, substantially as described.

3. In a stock-feeder, a feed-trough, a swinging division-frame longitudinally disposed relative to said trough, a guide-bar carried by said division-frame and spaced therefrom, a lever-arm formed with spaced side members and pivotally connected to said trough by one end and movably connected to said spaced bar by the other end, whereby said lever-arm when in one position will cause said frame to shut off access of the animals to said trough from one side, and when in its opposite position will embrace the opposite sides of said guide-bar and cause said frame to prevent the escape of the animals over said trough from the opposite side, and means for locking said guide-bar and lever-arm into engagement, substantially as described.

4. In a stock-feeder, a feed-trough, a swinging division-frame longitudinally disposed relative to said trough, a guide-bar carried by said division-frame and spaced therefrom, a lever-arm formed of spaced side members and pivotally connected to said trough by one end and movably connected to said spaced bar by the other end, whereby said lever-arm when in one position will cause said frame to shut off access of the animals to said trough from one side and when in its opposite position will embrace the opposite sides of said guide-bar and cause said frame to prevent the escape of the animals over said trough from the opposite side, and a movable clip adapted to lock said guide-bar and lever-arm into engagement, substantially as described.

5. In a stock-feeder, a feed-trough, a swinging division-frame longitudinally disposed relative to said trough, a guide-bar carried by said division-frame and spaced therefrom, a lever-arm formed of spaced side members and pivotally connected to said trough by one end and movably connected to said spaced bar by the other end, whereby said lever-arm when in one position will cause said frame to shut off access of the animals to said trough from one side and when in its opposite position will embrace the opposite sides of said guide-bar and cause said frame to prevent the escape of the animals over said trough from the opposite side, and a clip formed of a substantially circular loop extended on one side and movably engaging said bar, whereby said guide-bar and lever-arm may be locked into engagement, substantially as described.

6. In a stock-feeder, a feed-trough, a swinging frame longitudinally disposed relative to said trough, a guide-bar carried by said division-frame and spaced therefrom, a clip slidably disposed upon said guide-bar, a lever-arm consisting of spaced side members movably connected by one end to said clip and pivotally connected by their other ends to said trough, whereby said lever-arm when in one position will cause said frame to shut off access of the animals to said trough from one side, and when in its opposite relation will be positioned adjacent to said guide-bar and cause said frame to prevent the escape of the animals over said trough from the opposite side, and means for locking said guide-bar and lever-arm into engagement, substantially as described.

In testimony that I claim the foregoing as my own I have hereto affixed my signature in the presence of two witnesses.

GEORGE ADAM SPROW.

Witnesses:
F. W. DUNHAM,
ALLEN BYBEE.